United States Patent
Nakao

(10) Patent No.: US 7,940,013 B2
(45) Date of Patent: May 10, 2011

(54) LIGHTING APPARATUS AND DISPLAY APPARATUS THEREWITH

(75) Inventor: Shigeharu Nakao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 827 days.

(21) Appl. No.: 11/909,189

(22) PCT Filed: Apr. 18, 2006

(86) PCT No.: PCT/JP2006/308142
§ 371 (c)(1),
(2), (4) Date: Sep. 20, 2007

(87) PCT Pub. No.: WO2006/112459
PCT Pub. Date: Oct. 26, 2006

(65) Prior Publication Data
US 2009/0016060 A1 Jan. 15, 2009

(30) Foreign Application Priority Data
Apr. 18, 2005 (JP) .................. 2005-119755

(51) Int. Cl.
*G05F 1/00* (2006.01)
*G06F 17/00* (2006.01)
(52) U.S. Cl. .................. 315/291; 345/207; 345/204
(58) Field of Classification Search .................. 315/312, 315/224, 291, 307; 345/204, 207, 690, 76; 362/552, 561, 600, 800
See application file for complete search history.

(56) References Cited

U.S. PATENT DOCUMENTS

| | | | |
|---|---|---|---|
| 5,345,167 A | 9/1994 | Hasegawa et al. | |
| 6,507,159 B2 * | 1/2003 | Muthu | 315/307 |
| 7,052,138 B2 * | 5/2006 | Matsui | 353/31 |
| 7,144,130 B2 | 12/2006 | Toyota et al. | |
| 7,248,244 B2 * | 7/2007 | Akiyama | 345/102 |
| 7,423,626 B2 * | 9/2008 | Yamamoto et al. | 345/102 |
| 7,671,539 B1 * | 3/2010 | Mentzer et al. | 315/149 |
| 2005/0058450 A1 | 3/2005 | Yamamoto et al. | |

FOREIGN PATENT DOCUMENTS

| | | |
|---|---|---|
| JP | 1-146248 | 10/1989 |
| JP | 05-327450 | 12/1993 |
| JP | 08-313879 | 11/1996 |
| JP | 2001-066569 | 3/2001 |
| JP | 2003-163090 | 6/2003 |
| JP | 2004-29141 | 1/2004 |
| JP | 2004-363061 | 12/2004 |
| JP | 2005-91526 | 4/2005 |

* cited by examiner

*Primary Examiner* — Douglas W Owens
*Assistant Examiner* — Minh D A
(74) *Attorney, Agent, or Firm* — Fish & Richardson P.C.

(57) ABSTRACT

A lighting apparatus includes light emitters to illuminate an illuminated member. Relationship information about a relationship between variations in the amount of light emitted by each of the light emitters and variations in an amount of light received on each of the different portions of the illuminated member are stored in memory. A controller is operable to control individually, based on the relationship information, the amount of the light emitted by each of the light emitters so that the amount of light received on the different portions of the illuminated member are substantially even.

6 Claims, 2 Drawing Sheets

LIGHTING APPARATUS AND DISPLAY APPARATUS THEREWITH

TECHNICAL FIELD

The present invention relates to a lighting apparatus and a display apparatus provided therewith, and, more particularly, to an LED (light emitting diode) backlight system for a liquid crystal display.

BACKGROUND ART

Today, as display means for use in different types of electric appliances such as television sets, PDAs (personal digital/data assistant) and mobile telephones, liquid crystal displays are widely used for their light weight, slimness, and low power consumption; especially widely used are transmissive liquid crystal displays that are illuminated from behind to offer improved viewability of what is displayed thereon.

To achieve improved viewability and display quality in transmissive liquid crystal displays, illumination light from a backlight needs to be evenly guided to the display panel to reach all corners thereof so that even surface emission from all over the display panel is achieved with reduced unevenness in light amount.

To that end, in conventional transmissive liquid crystal displays, light guides (such as reflective plates and light guide plates) are constantly being improved; in addition, with the trend toward increasingly large-screen display panels, it is becoming common to illuminate a display panel with a plurality of backlights.

According to one conventionally disclosed and proposed technology (for example, see patent document 1 listed below) related to the present invention, a display panel is divided into predetermined areas, and the hue and brightness in each area are detected for automatic adjustment.

As other conventional technologies related to the present invention, there are disclosed and proposed various light-emitting diode driving apparatuses and lighting apparatuses (for example, see patent documents 2 and 3 listed below) that keep constant the amount of light emitted from a light-emitting diode by use of a photosensor.

Patent document 1: JP-A-H08-313879
Patent document 2: JP-A-H05-327450
Patent document 3: JP-A-2003-163090

DISCLOSURE OF THE INVENTION

Problems to be Solved by the Invention

To be sure, with a lighting apparatus adopting the conventional technology of patent document 1, it is possible to realize a bright display screen with little unevenness in hue and brightness.

Inconveniently, however, with this conventional technology, simply the image light emanating from a display panel is monitored to produce correction data for the drive data (image signal) so that, according to the correction data, the hue and brightness in different areas are made even. Thus, in normal viewing in which the image light constantly changes according to what is displayed, the correction data cannot be changed. More specifically, in addition to a normal mode as one for an ordinary state, a correction mode is separately provided where the correction data can be changed based on the input data from an RGB sensor. Thus, in the normal mode, the drive data for different areas is automatically adjusted based on the correction data obtained in the correction mode.

Hence, disadvantageously, with this conventional technology, correction cannot be performed if the amount of light emitted from a backlight varies for some reason (e.g., due to surface temperature variation or secular change) during the normal viewing.

In particular, in a transmissive liquid crystal display whose display panel is illuminated with a plurality of backlights, when the backlights emit different amounts of light, unevenness in light amount (therefore, unevenness in hue and brightness) occurs on the display panel, leading to degraded viewability and display quality. This may make the inconveniences described above more noticeable.

As described above, this conventional technology is not intended to control the amount of light emitted from backlights, and thus cannot simply be combined with another conventional technology related to the control of the amount of light emitted from a backlight (such as those of patent documents 2 and 3). Even if these conventional technologies are combined together, seeing that they do not disclose an appropriate method by which to control a plurality of backlights, it is still not easy for those skilled in the art to reduce unevenness in light amount on a display panel.

The above description discusses inconveniences as conventionally experienced in transmissive liquid crystal displays, but such inconveniences are experienced in other lighting apparatuses and display apparatuses as well.

An object of the present invention is to provide a lighting apparatus that can reduce unevenness in light amount in a case where an illuminated member is illuminated with a plurality of light emitting means, and to provide a display apparatus that operates with little unevenness in hue and brightness and hence with improved viewability and display quality.

Means for Solving the Problem

To achieve the above object, according to one aspect of the present invention, a lighting apparatus includes: a plurality of light emitting means for illuminating an illuminated member; light amount control means for individually controlling the amount of light emitted by each of the light emitting means; a plurality of light amount detection means for respectively detecting amounts of light received on the different portions of the illuminated member; light amount determination means for determining a correlation between the detected amounts of light received on the different portions of the illuminated member; and storing means for storing relationship information on the relationship between variations in the amount of light emitted by each of the light emitting means and variations in the amount of light received on each of the different portions of the illuminated member. Here, the light amount control means monitors the result of determination by the light amount determination means, and individually controls, based on the relationship information, the amount of light emitted by each of the light emitting means so that the amounts of light received on the different portions of the illuminated member are made even (a first configuration). With this configuration, it is possible to reduce unevenness in light amount in a case where an illuminated member is illuminated with a plurality of light emitting means.

In the lighting apparatus of the first configuration, the light emitting means may be a light emitting diode or a light emitting diode array composed of a plurality of light emitting diodes connected in series (a second configuration). With this configuration in which light emitting diodes are used as a light source, it is possible to achieve low power consumption, a long lifetime, low heat generation and space reduction as compared with the configuration including a fluorescent tube or the like.

The lighting apparatus of any one of the first and second configurations may include voltage adjustment means for collectively adjusting drive voltages for the light emitting means based on an instruction from the light amount control means (a third configuration). With this configuration, it is possible to collectively adjust overall contrast of the illuminated member.

According to another aspect of the invention, a display apparatus includes a display panel and a lighting apparatus for illuminating the display panel. Here, the lighting apparatus may adopt any one of the first to third configurations. With this configuration, it is possible to constantly keep low unevenness in light amount (therefore, unevenness in hue and brightness on a display panel) in a case where an illuminated member serving as a display panel is illuminated with a plurality of light emitting means. This leads to improved viewability and display quality.

ADVANTAGES OF THE INVENTION

As described above, with the lighting apparatus according to the invention and the display apparatus incorporating such a lighting apparatus, it is possible to provide a lighting apparatus that can reduce unevenness in light amount in a case where an illuminated member is illuminated with a plurality of light emitting means, and to provide a display apparatus that operates with little unevenness in hue and brightness and hence with improved viewability and display quality.

LIST OF REFERENCE SYMBOLS

Figure 1:
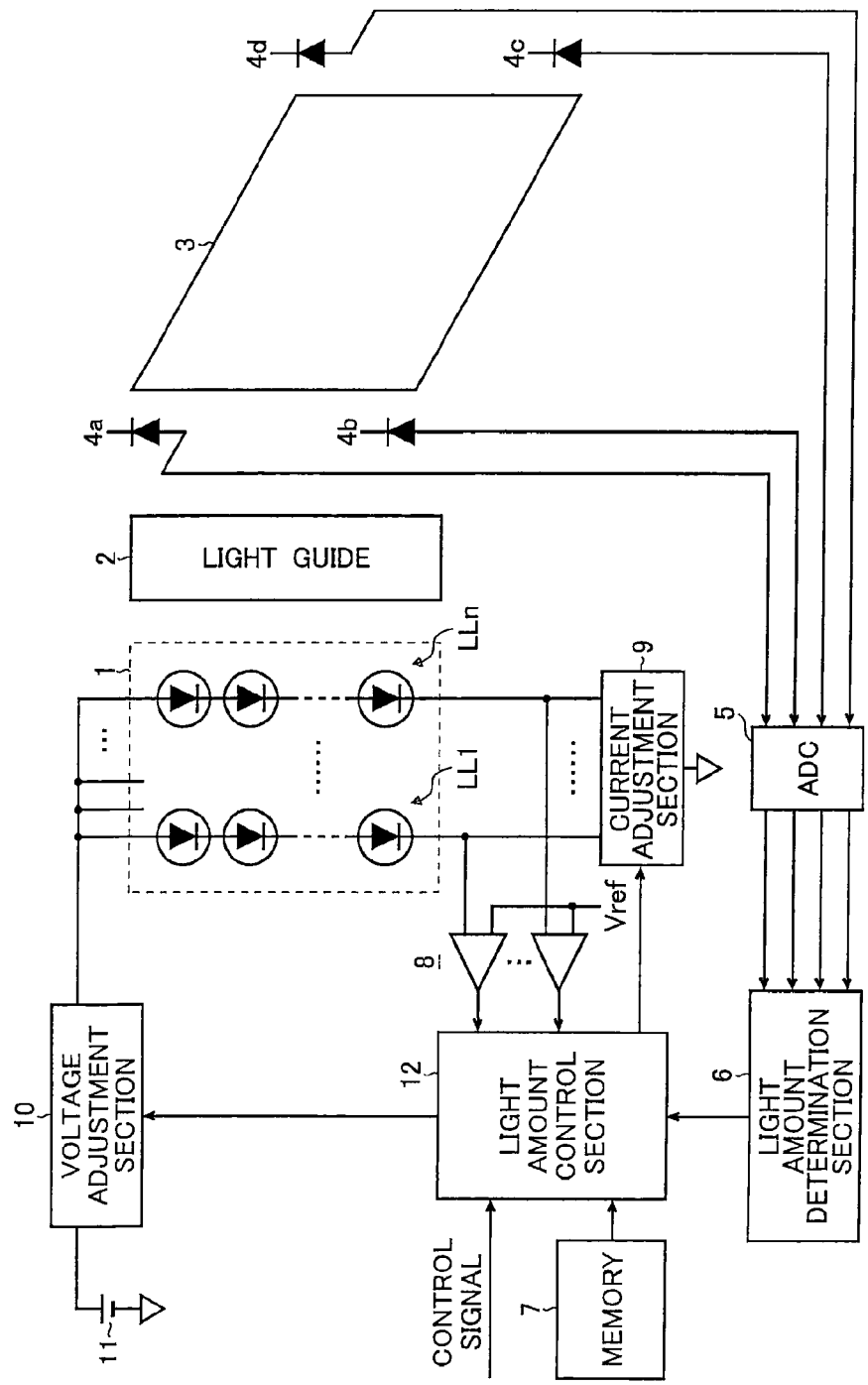
[FIG. 1] A block diagram showing a display apparatus as an embodiment of the invention.

1 Light emitting section
LL1 to LLn LED array
2 Light guide
3 Liquid crystal display panel (LCD panel)
4a, 4b, 4c and 4d Light sensor
5 Analog-to-digital converter (ADC)
6 Light amount determination section
7 Memory
8 Error detection section
9 Current adjustment section
10 Voltage adjustment section
11 Direct current power supply
12 Light amount control section

BEST MODE FOR CARRYING OUT THE INVENTION

FIG. 1 is a block diagram showing a display apparatus as an embodiment of the present invention. As shown in FIG. 1, the display apparatus of this embodiment is a transmissive liquid crystal display composed of: a light emitting section 1; a light guide 2; a liquid crystal display panel 3 (hereinafter referred to as "LCD (liquid crystal display) panel 3"); light sensors 4a to 4d; an analog-to-digital converter 5 (hereinafter referred to as "ADC (analog-to-digital converter) 5"); a light amount determination section 6; a memory 7; an error detection section 8; a current adjustment section 9; a voltage adjustment section 10; a direct current power supply 11; and a light amount control section 12.

The light emitting section 1 has n columns (n≧2) of light emitting diode arrays LL1 to LLn (hereinafter referred to as "LED arrays LL1 to LLn"), each having a plurality of light emitting diodes (hereinafter referred to as "LEDs (light emitting diodes)") connected in series. The illumination light produced by the light emitting section 1 is used as backlight to illuminate the LCD panel 3 from behind through the light guide 2. With this configuration in which LEDs are used as a backlight, it is possible to achieve low power consumption, a long lifetime, low heat generation and space reduction as compared with the configuration including a fluorescent tube or the like.

Each LED of the LED arrays LL1 to LLn is composed of a group of three LED elements that emit red, green and blue light respectively. The light emitted from the LED elements is mixed together to generate illumination light having a desired emission color (white in this embodiment). With this configuration in which white LEDs are used as a backlight, it is possible to expand the range of color reproduction by the LCD panel 3 as compared with the configuration including a fluorescent tube or the like.

The light guide 2 serves as means for evenly emitting from its surface the illumination light radiated by the light emitting section 1 to guide the illumination light to all over the LCD panel 3. The light guide 2 is composed of a reflective plate and a light guide plate (a transparent plate whose surface is specially treated).

The LCD panel 3 has, sealed between two glass plates, liquid crystal of which the molecules change their alignment direction on application of a voltage with the result that the transmissivity with which the light shone from behind—from the light-emitting section through the light guide 2—is transmitted is varied; thereby the LCD panel 3 serves as means for displaying an image. The image formation by the LCD panel 3 is controlled by an unillustrated LCD controller.

The light sensors 4a to 4d serve as light amount detection means for respectively detecting the amounts of light received on different portions of the LCD panel 3, which is an illuminated member. The following description of this embodiment deals with an example where the light sensors 4a to 4d are realized with photodiodes, each being able to collectively detect the amounts of red, green and blue light received thereon, and the light sensors 4a to 4d are arranged at the four corners of the LCD panel 3, respectively. The invention is, however, not limited to such an example, and the amounts of light received for separate colors may be detected with a plurality of light sensors respectively so that the amounts of detected light are thereafter added up (see FIG. 2). The arrangement and number of light sensors are not limited to those described in this embodiment, but may be modified as required. Furthermore, the number of light sensors does not need to be equal to the number of columns of the LED arrays LL1 to LLn.

ADC 5 serves as means for converting analog light amount signals obtained from the light sensors 4a to 4d into digital light amount signals to feed these to the light amount determination section 6.

The light amount determination section 6 serves as means that determines the correlation (for example, whether the amount of light detected by the light sensor 4a is less than the amounts of light detected by the other light sensors 4b to 4d) between the digital light amount signals received from ADC 5, that is, between the amounts of light received on the different portions of the LCD panel 3 as detected by the light sensors 4a to 4d, and that transmits the result of the determination to the light amount control section 12. In a case where more emphasis is placed on avoiding fluctuation of the determination result, the light amount determination section 6 may transmit a definite determination result to the light amount control section 12 only when the same correlation is found a predetermined number of times successively.

The memory 7 serves as storing means for storing information on the relationship between variations in the amount of light emitted by the LED arrays LL1 to LLn and variations in the amount of light received on the relevant portions of the LCD panel 3. The memory 7 is composed of a ROM (read only memory) and a RAM (read access memory). The just mentioned information shows how variations in the amount of light emitted by each of the LED arrays LL1 to LLn affect the amount of light received on each of the different portions of the LCD panel 3 as detected by the light sensors 4a to 4d. The information is derived from previously performed measurements, empirical rules or the like. More specifically, the information previously stored in the memory 7 is, for example, information that when the amount of light (a drive current) emitted by the LED array LL1 is increased by a predetermined amount $1x$, the amounts of light (detection currents) received on the different portions of the LCD panel 3 as detected by the light sensors 4a to 4d increase by certain amounts Ia to Id respectively. Also previously stored in the memory 7 is similar relationship information with respect to the other LED arrays.

The error detection section 8 serves as means for detecting an error between a target emitted light amount (set with a voltage Vref) and the amount of light actually emitted by each of the LED arrays LL1 to LLn to transmit the result of the detection to the light amount control section 12.

The current adjustment section 9 serves as means for individually adjusting the drive current for each of the LED arrays LL1 to LLn based on instructions from the light amount control section 12.

The voltage adjustment section 10 is a direct current-to-direct current converter that generates the drive voltages for the LED arrays LL1 to LLn from the voltage supplied by the direct current power supply 11, and serves as means for collectively adjusting the drive voltages for the LED arrays LL1 to LLn based on instructions from the light amount control section 12.

The direct current power supply 11 serves as means for supplying electric power to different sections of the display apparatus including the voltage adjustment section 10. Used as the direct current power supply 11 may be an alternating current-to-direct current converter for converting a commercially distributed alternating current voltage into a direct current voltage, or may be a battery such as a secondary battery.

The light amount control section 12 serves as means for individually controlling the amounts of light emitted from the LED arrays LL1 to LLn by controlling the drive currents for the LED arrays LL1 to LLn through the current adjustment section 9. The light amount control section 12 also serves as means for collectively controlling the amounts of light emitted from the LED arrays LL1 to LLn by controlling the drive voltages for the LED arrays LL1 to LLn through the voltage adjustment section 10.

As its basic operations, the light amount control section 12 achieves: emitted light amount control based on the result of detection by the error detection section 8 in order to reduce the difference between the target emitted light amount and the amount of light actually emitted; and emitted light amount control based on a control signal from an unillustrated host such as a CPU (central processing unit) in order to adjust the overall contrast of the LCD panel 3.

Moreover, the light amount control section 12 achieves, as an operation characteristic of the present invention, light amount control based on the result of determination by the light amount determination section 6 and the relationship information stored in the memory 7.

To achieve such light amount control, the light amount control section 12 monitors the result of determination by the light amount determination section 6, and individually controls the amounts of light emitted from the LED arrays LL1 to LLn (drive currents) based on the relationship information stored in the memory 7 so that the amounts of light (detection currents) received on the different portions of the LCD panel 3 as detected by the light sensors 4a to 4d are made even.

In a case, for example, where, based on the result of determination by the light amount determination section 6, received light amount as detected by the light sensor 4a is found to be less than the received light amounts as detected by the other light sensors 4b to 4d, the light amount control section 12 appropriately controls, based on the relationship information stored in the memory 7, the amounts of light emitted from the LED arrays LL1 to LLn while keeping a balance therebetween so as to increase the received light amount as detected by the light sensor 4a or to decrease the received light amounts as detected by the light sensors 4b to 4d.

Here, if the received light amount as detected by the light sensor 4a is most affected by variations in the amount of light emitted from the LED array LL1, the light amount control section 12 mainly increases or decreases, based on the relationship information stored in the memory 7, the amount of light emitted from the LED array LL1, or if the received light amount as detected by the light sensor 4a is most affected by variations in the amount of light emitted from another LED array, the light amount control section 12 increases or decreases the amount of light emitted from that LED array.

Unlike the conventional configuration where the image light emanating from the LCD panel 3 is detected, here, as described above, the amounts of light received on the different portions of the LCD panel 3, which is an illuminated member (i.e., the amounts of light shone on the different portions of the LCD panel 3 through the light guide 2), are each detected and the detection data is fed back to the light amount control section 12. Thus, even in normal viewing in which the image light emanating from the LCD panel 3 constantly varies according to what is displayed, the amounts of light emitted from the LED arrays LL1 to LLn can be controlled without being affected. Hence, it is possible to constantly keep low unevenness in light amount (therefore, unevenness in hue and brightness) on the LCD panel 3, leading to improved viewability and display quality.

With the configuration of this embodiment in which the amount of light emitted by each of the LED arrays LL1 to LLn is individually controlled based on the result of determination by the light amount determination section 6 and the relationship information stored in the memory 7, it is possible to easily and appropriately make even the amounts of light received on the different portions of the LCD panel 3.

With the configuration of this embodiment in which the illumination light passing through the light guide 2 is detected with the light sensors 4a to 4d, it is possible to correct not only variations in the amount of light emitted from LEDs themselves resulting from temperature variation or secular change, but also variations in light amount as caused by a change in characteristics resulting from deterioration or failure of the whole backlight system including the light guide 2. This helps keep constant the amount of light received on the LCD panel 3. Thus, it is possible to extend the lifetime of the whole system and improve the reliability thereof.

Although the embodiment described above discusses an example where the invention is applied to a transmissive liquid crystal display apparatus, the invention is not limited to such an example but finds wide application in other lighting apparatuses and display apparatuses.

Otherwise than specifically described by way of an embodiment above, many modifications and variations are possible without departing from the sprit of the invention.

For example, although the embodiment described above discusses an example where light emitting means produces white light by mixing red, green and blue light, the invention is not limited to such an example but can naturally be applied to a configuration including light emitting means for emitting light having a desired color by mixing light of different colors or a configuration including light emitting means for emitting light having a single color.

When there is no need to collectively adjust the amount of light emitted by the whole light emitting section 1, the light amount control section 12 does not need to control the voltage adjustment section 10.

Figure 2:
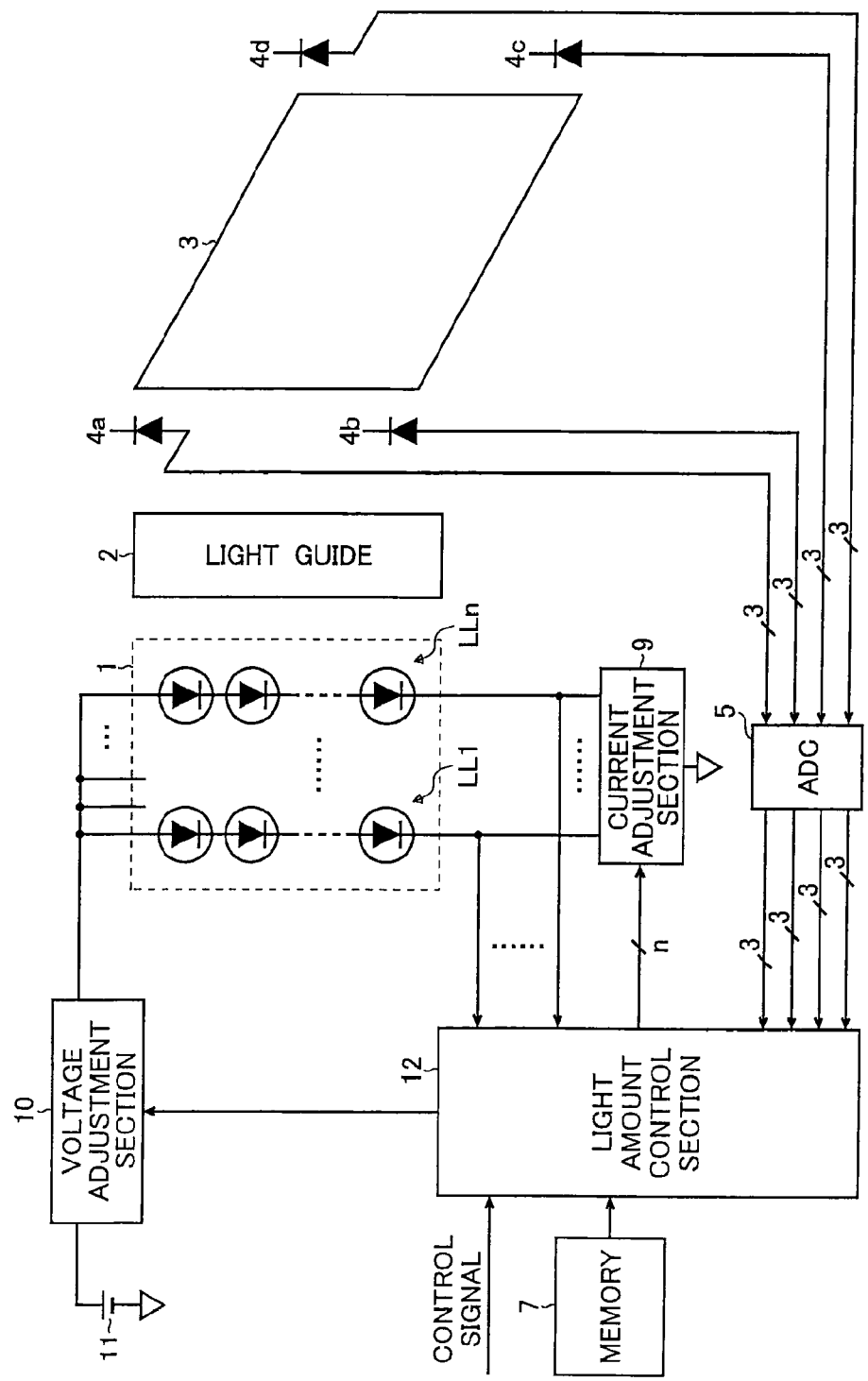
[FIG. 2] A block diagram showing a display apparatus as another embodiment of the invention.

With the configuration of the invention in which the amounts of light received on the different portions of the display panel 3 are so monitored that the currents passed to the LED arrays LL1 to LLn are each adjusted, it is possible to adjust the amount of light actually emitted from the light emitting section 1 to the target light amount even without provision of the error detection section 8 as shown in FIG. 2, though at the cost of extra time.

As shown in FIG. 2, the light amount control section 12 may incorporate the function of the light amount determination section 6.

INDUSTRIAL APPLICABILITY

Lighting apparatuses according to the present invention can be used as backlights for liquid crystal displays, and can be incorporated in display apparatuses such as liquid crystal television sets (especially with large screens), liquid crystal displays for PDAs and liquid crystal displays for mobile telephones.

What is claimed is:

1. A lighting apparatus comprising:
   a plurality of light emitters to illuminate an illuminated member;
   light amount controller to control individually an amount of light emitted by each of the light emitters;
   a plurality of light amount detectors to detect respectively amounts of light received on different portions of the illuminated member;
   light amount determination section to determine a correlation between the detected amounts of light received on the different portions of the illuminated member; and
   memory to store relationship information on a relationship between variations in the amount of light emitted by each of the light emitters and variations in an amount of light received on each of the different portions of the illuminated member,
   wherein the relationship information indicates how variations in the amount of light emitted by each of the light emitters affect the amount received on each of the different portions of the illuminated member as detected by the light amount detectors, and
   wherein the light amount controller is operable to monitor a result of determination by the light amount determination section, and to control individually, based on the relationship information, the amount of light emitted by each of the light emitters so that the amounts of light received on the different portions of the illuminated member are substantially even.

2. The lighting apparatus of claim 1, wherein the light emitters comprise light emitting diodes or a light emitting diode array composed of a plurality of light emitting diodes connected in series.

3. The lighting apparatus of any one of claims 1 and 2, further comprising:
   a voltage adjuster to collectively adjust drive voltages for the light emitters based on an instruction from the light amount controller.

4. A display apparatus comprising a display panel and a lighting apparatus for illuminating the display panel, wherein the lighting apparatus comprises:
   a plurality of light emitters to illuminate an illuminated member;
   light amount controller to control individually an amount of light emitted by each of the light emitters;
   a plurality of light amount detectors to detect respectively amounts of light received on different portions of the illuminated member;
   light amount determination section to determine a correlation between the detected amounts of light received on the different portions of the illuminated member; and
   memory to store relationship information on a relationship between variations in the amount of light emitted by each of the light emitters and variations in an amount of light received on each of the different portions of the illuminated member,
   wherein the relationship information indicates how variations in the amount of light emitted by each of the light emitters affect the amount received on each of the different portions of the illuminated member as detected by the light amount detectors, and
   wherein the light amount controller is operable to monitor a result of determination by the light amount determination section, and to control individually, based on the relationship information, the amount of light emitted by each of the light emitters so that the amounts of light received on the different portions of the illuminated member are substantially even.

5. The display apparatus of claim 4, wherein the light emitters comprise light emitting diodes or a light emitting diode array composed of a plurality of light emitting diodes connected in series.

6. The display apparatus of any one of claims 4 and 5, wherein the lighting apparatus further comprises a voltage adjuster to collectively adjust drive voltages for the light emitters based on an instruction from the light amount controller.

* * * * *